(12) United States Patent
Michiguchi et al.

(10) Patent No.: US 8,970,398 B2
(45) Date of Patent: Mar. 3, 2015

(54) PARKING ASSISTANCE DEVICE USING MULTIPLE PARKING GUIDANCE INDICATORS

(75) Inventors: Masayoshi Michiguchi, Kanagawa (JP); Tatsuto Ryugo, Tokyo (JP); Kenji Okano, Kanagawa (JP); Yukiko Kanno, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 365 days.

(21) Appl. No.: 13/580,054

(22) PCT Filed: Feb. 25, 2011

(86) PCT No.: PCT/JP2011/001118
§ 371 (c)(1),
(2), (4) Date: Aug. 20, 2012

(87) PCT Pub. No.: WO2011/105105
PCT Pub. Date: Sep. 1, 2011

(65) Prior Publication Data
US 2012/0314056 A1    Dec. 13, 2012

(30) Foreign Application Priority Data
Feb. 26, 2010    (JP) .................................. 2010-041856

(51) Int. Cl.
*G08B 21/00* (2006.01)
*B62D 15/02* (2006.01)
*B60W 30/18* (2012.01)

(52) U.S. Cl.
CPC ....... *B62D 15/028* (2013.01); *B60W 30/18036* (2013.01); *B62D 15/0275* (2013.01)

USPC .............................. 340/932.2; 701/1; 348/118

(58) Field of Classification Search
USPC .......... 340/932.2, 425.5; 348/118, 136; 701/1
See application file for complete search history.

(56) References Cited

U.S. PATENT DOCUMENTS

| 6,999,002 B2 | 2/2006 | Mizusawa et al. |
| 2004/0201670 A1 | 10/2004 | Mizusawa et al. |

(Continued)

FOREIGN PATENT DOCUMENTS

| EP | 1253065 A2 | 10/2002 |
| EP | 1839948 A1 | 10/2007 |

(Continued)

OTHER PUBLICATIONS

Supplementary European Search Report for Application No. 11747069.0-1755/2540578 dated Jul. 4, 2013.

(Continued)

*Primary Examiner* — Jeffery Hofsass
(74) *Attorney, Agent, or Firm* — Pearne & Gordon LLP

(57) ABSTRACT

Disclosed is a parking assistance device such that it is easy to understand the process for aligning the vehicle with the guidance completion position of each stage of parking, specifically the parking start position, the steering wheel reversal position and the intended parking position. Specifically disclosed is a parking assistance device wherein a control device (11) switches to a first parking guidance indicator (45A) during first parking guidance for guiding the vehicle to the parking start position, switches to a second parking guidance indicator (45B) during second parking guidance for guiding the vehicle to the steering wheel reversal start position, and switches to a third parking guidance indicator (45C) during third parking guidance for guiding the vehicle to the final parking position.

5 Claims, 6 Drawing Sheets

(56) References Cited

U.S. PATENT DOCUMENTS

2007/0146166 A1  6/2007  Sato et al.
2008/0094252 A1  4/2008  Uhler

FOREIGN PATENT DOCUMENTS

| | | |
|---|---|---|
| FR | 2895348 A1 | 6/2007 |
| JP | 2001-180402 A | 7/2001 |
| JP | 2003-291759 A | 10/2003 |
| JP | 2004-106615 A | 4/2004 |
| JP | 2006-027334 A | 2/2006 |
| JP | 2006-044415 A | 2/2006 |
| JP | 2009-202724 A | 9/2009 |
| WO | 2005/100135 A1 | 10/2005 |

OTHER PUBLICATIONS

International Search Report for application No. PCT/JP2011/001118 dated Apr. 5, 2011.

PARKING ASSISTANCE DEVICE USING MULTIPLE PARKING GUIDANCE INDICATORS

TECHNICAL FIELD

The present invention relates to a parking assistance apparatus that assists parking when a vehicle including the apparatus is parked by reversing while steering from a parking start position and reversing the steering wheel midway.

BACKGROUND ART

Conventionally, as a parking assistance apparatus that assists vehicle operation when a vehicle including the apparatus is facing in the direction of the parking start position, and is parked by reversing while steering from the parking start position and reversing the steering wheel midway, there is an apparatus that assists vehicle operation by displaying a marker serving as a guide for a point at which the driver should reverse (swing back) the steering wheel superimposed on an overhead image, giving visual notification of a guide for a point at which the steering wheel should be reversed, and giving guidance vis-a-vis the intended parking position according to the degree of steering (see Patent Literature 1 and Patent Literature 2, for example).

CITATION LIST

Patent Literature

PTL 1 Japanese Patent Application Laid-Open No. 2006-027334
PTL 2 Japanese Patent Application Laid-Open No. 2006-044415

SUMMARY OF INVENTION

Technical Problem

However, with a conventional parking assistance apparatus, the display image shape and guidance method differ for each stage of parking such as the parking start position, steering wheel reversal start position, and intended parking position. Consequently, there is a problem in that the driver must understand the meaning of the guidance display image and guidance method at each stage, and it is difficult to understand how to align the vehicle with the completion position of each stage.

The present invention has been devised in order to solve the above problem of conventional technology, and it is an object of the present invention to provide a parking assistance apparatus such that it is easy to understand the method of aligning a vehicle including the apparatus with the guidance completion position of each stage of parking such as the parking start position, steering wheel reversal start position, and intended parking position.

Solution to Problem

In order to achieve the above object, in a parking assistance apparatus of the present invention, a control section switches to a first parking guidance indicator during first parking guidance for guiding a vehicle including the apparatus to a parking start position, switches to a second parking guidance indicator during second parking guidance for guiding the vehicle to a steering wheel reversal start position, and switches to a third parking guidance indicator during third parking guidance for guiding the vehicle to a final parking position, the final target position of the first parking guidance being entry of the first parking guidance indicator into the final parking position, the final target position of the second parking guidance being entry of the second parking guidance indicator into the final parking position, and the final target position of the third parking guidance being entry of the third parking guidance indicator into the final parking position.

Advantageous Effects of Invention

The present invention provides an effect of enabling a parking assistance apparatus to be provided such that it is easy to understand the method of aligning a vehicle including the apparatus with the guidance completion position of each stage of parking such as the parking start position, steering wheel reversal start position, and intended parking position.

BRIEF DESCRIPTION OF DRAWINGS

FIG. 6B is a drawing explaining in an image form another example of the superimposition of the second parking guidance in FIG. 3.

DESCRIPTION OF EMBODIMENT

Now, a parking assistance apparatus according to an embodiment of the present invention will be described with reference to the accompanying drawings.

Figure 1:
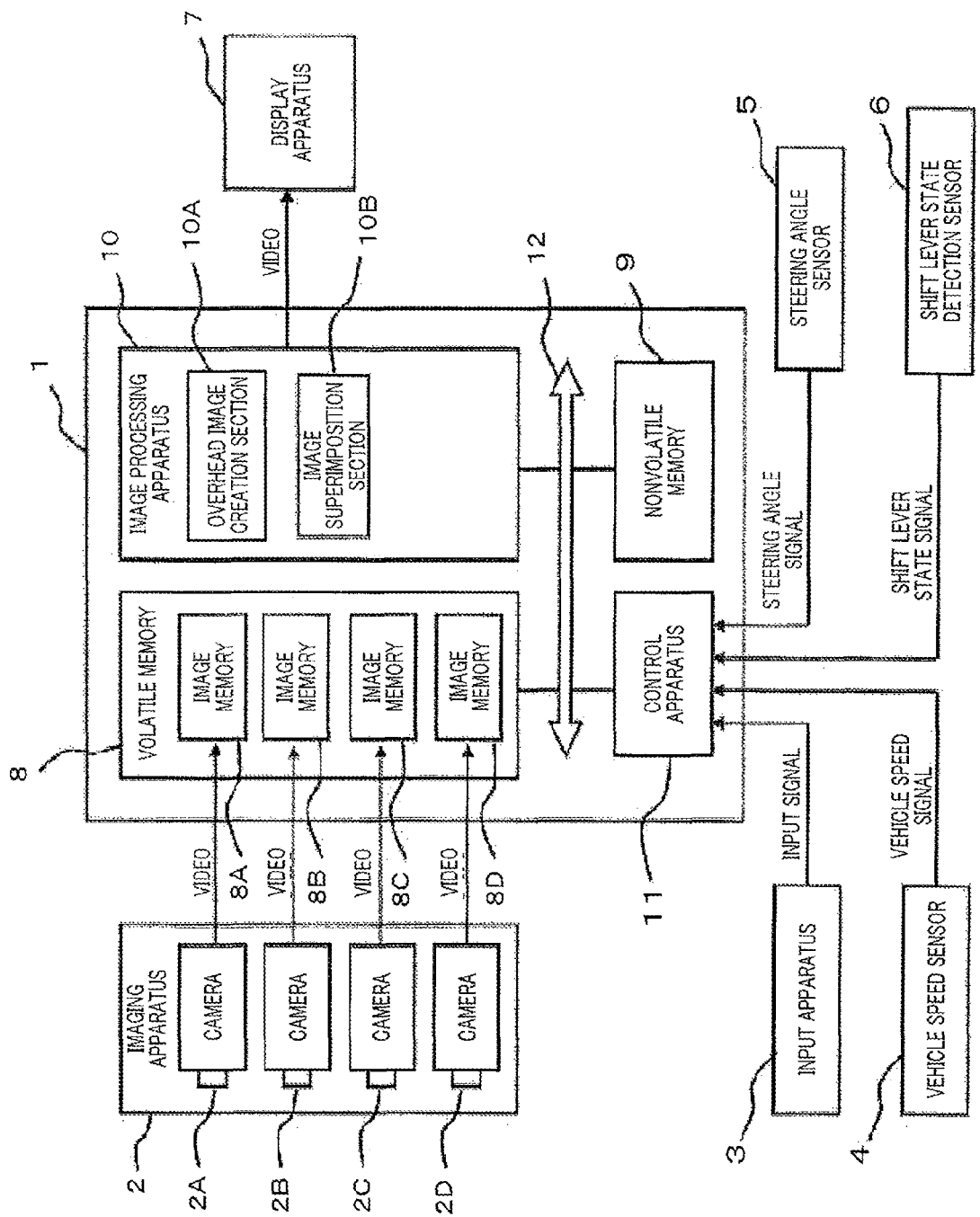
FIG. 1 is a block diagram showing the configuration of a parking assistance apparatus according to an embodiment of the present invention.

FIG. 1 is a block diagram showing the configuration of a parking assistance apparatus according to an embodiment of the present invention As shown in FIG. 1, parking assistance apparatus 1 is connected to imaging apparatus 2, input apparatus 3, vehicle speed sensor 4, steering angle sensor 5, shift lever state detection sensor 6, and display apparatus 7. Parking assistance apparatus 1 has volatile memory 8, nonvolatile memory 9, image processing apparatus 10, control apparatus 11, and bus 12 that connects these to each other. At predetermined intervals, parking assistance apparatus 1 composes an image indicating parking guidance in a captured image of surroundings of a vehicle including the apparatus input from imaging apparatus 2 based on input signals from input apparatus 3, vehicle speed sensor 4, steering angle sensor 5, and shift lever state detection sensor 6, and outputs this composite image to display apparatus 7 as video.

Figure 2:
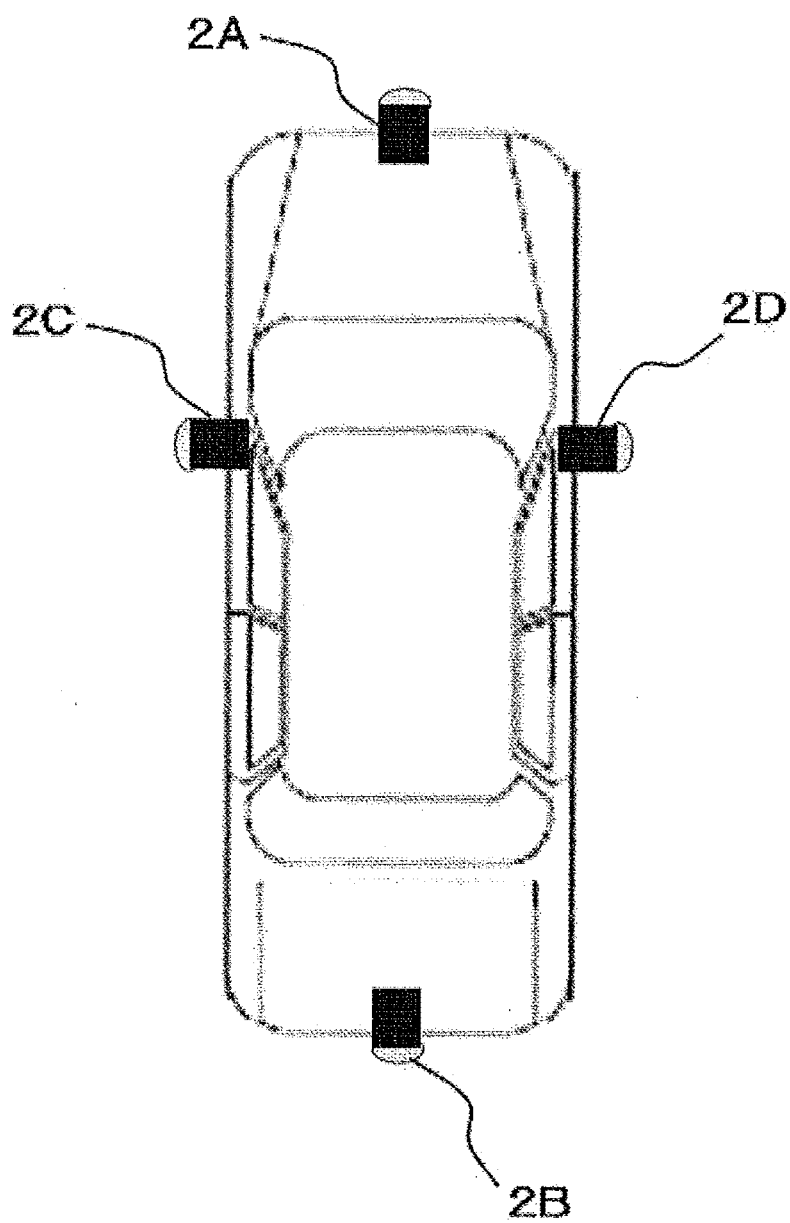
FIG. 2 is a drawing explaining installation of an imaging apparatus connected to the parking assistance apparatus that is a principal part in FIG. 1, on a vehicle including the apparatus.

Imaging apparatus 2 has cameras 2A through 2D. The installation positions of these cameras 2A through 2D on the vehicle will now be described. FIG. 2 is a drawing explaining installation of imaging apparatus 2 on the vehicle. As shown in FIG. 2, cameras 2A, 2B, 2C, and 2D are installed at the front, at the rear, on the left side, and on the right side of the vehicle, respectively. This installation arrangement of cameras 2A through 2D enables imaging apparatus 2 to image the entire surroundings of the vehicle. In this embodiment, imaging apparatus 2 has a plurality of cameras for imaging the entire surroundings of the vehicle, but it is sufficient to be able to image part of the surroundings of the vehicle through the provision of at least one or more cameras. Also, the installation positions of imaging apparatus 2 may be any points allowing imaging of the exterior of the vehicle. Imaging apparatus 2 inputs captured images captured at predetermined intervals to parking assistance apparatus 1 as video.

Input apparatus 3 comprises a touch panel, remote control, or switch, for example. If input apparatus 3 comprises a touch panel, it may be provided on display apparatus 7. Input apparatus 3 is operated by a user, and outputs an input signal indicating a user command to parking assistance apparatus 1. For example, input apparatus 3 outputs a parking guidance switching command signal to parking assistance apparatus 1.

Vehicle speed sensor 4, steering angle sensor 5, and shift lever state detection sensor 6 output, to parking assistance apparatus 1, a vehicle speed signal indicating the speed of the vehicle, a steering angle signal indicating the angle of the steering wheel, and a shift lever state signal indicating the state of the shift lever, respectively.

Display apparatus 7 comprises a car navigation system or rear seat display, for example. Display apparatus 7 receives input of the composite images combining the captured images of the surroundings of the vehicle and parking guidance from parking assistance apparatus 1, and displays this composite image as video.

Volatile memory 8 comprises a video memory or a RAM (Random Access Memory), for example. Volatile memory 8 has image memories 8A through 8D. Image memories 8A through 8D are connected to cameras 2A through 2D, respectively. Volatile memory 8 temporarily stores video data obtained by means of the captured images input at predetermined intervals from imaging apparatus 2. Video data stored in volatile memory 8 is output to image processing apparatus 10 via bus 12.

Nonvolatile memory 9 comprises a flash memory or a ROM (Read Only Memory), for example. Nonvolatile memory 9 stores various kinds of image data such as image data of the vehicle and image data used for parking guidance, and a mapping table for creating a viewpoint-converted image from images captured by cameras 2A through 2D. As the image data used for parking guidance, nonvolatile memory 9 has at least a first parking guidance indicator that guides the vehicle to the parking start position, a second parking guidance indicator that guides the vehicle to the steering wheel reversal start position, and a third parking guidance indicator that guides the vehicle to the final parking position. The various kinds of image data stored in nonvolatile memory 9 are output to image processing apparatus 10.

Image processing apparatus 10 comprises an ASIC (Application Specific Integrated Circuit) or VLSI (Very Large Scale Integration), for example. Image processing apparatus 10 has overhead image creation section 10A and image superimposition section 10B. Image processing apparatus 10 is connected to display apparatus 7. Overhead image creation section 10A combines video data of the images captured by cameras 2A through 2D input from image memories 8A through 8D into an overhead image. At predetermined intervals, image superimposition section 10B creates a composite image in which the image data used for parking guidance and the image data of the vehicle input from nonvolatile memory 9 are superimposed on this overhead image. Image processing apparatus 10 outputs these composite images created at predetermined intervals to display apparatus 7 as video. The relative positional relationship between the image data used for parking guidance and the image data of the vehicle is always set in a fixed manner. Specifically, the relative positional relationship between the image data of the first parking guidance indicator and the image data of the vehicle is always set in a fixed manner during first parking guidance for guiding the vehicle to the parking start position. The relative positional relationship between the image data of the second parking guidance indicator and the image data of the vehicle is always set in a fixed manner during second parking guidance for guiding the vehicle to the steering wheel reversal start position. The relative positional relationship between the image data of the third parking guidance indicator and the image data of the vehicle is always set in a fixed manner during third parking guidance for guiding the vehicle into a target parking space (the final parking position). However, the relative positional relationship between the image data of the first parking guidance indicator and the image data of the vehicle, the relative positional relationship between the image data of the second parking guidance indicator and the image data of the vehicle, and the relative positional relationship between the image data of the third parking guidance indicator and the image data of the vehicle, are set to be different from each other.

Control apparatus 11 comprises a CPU (Central Processing Unit) and an LSI (Large Scale Integration), for example. Control apparatus 11 is connected to input apparatus 3, vehicle speed sensor 4, steering angle sensor 5, and shift lever state detection sensor 6. Control apparatus 11 controls video processing by image processing apparatus 10, data read from volatile memory 8 and nonvolatile memory 9, input from imaging apparatus 2 and output to display apparatus 7, and so forth, based on signals input from input apparatus 3, vehicle speed sensor 4, steering angle sensor 5, and shift lever state detection sensor 6. For example, control apparatus 11 performs switching control of the first through third parking guidance indicators that image superimposition section 10B superimposes on the overhead image based on various kinds of signals input from input apparatus 3, vehicle speed sensor 4, steering angle sensor 5, and shift lever state detection sensor 6.

Next, parking assistance processing by control apparatus 11 will be described.

Figure 3:
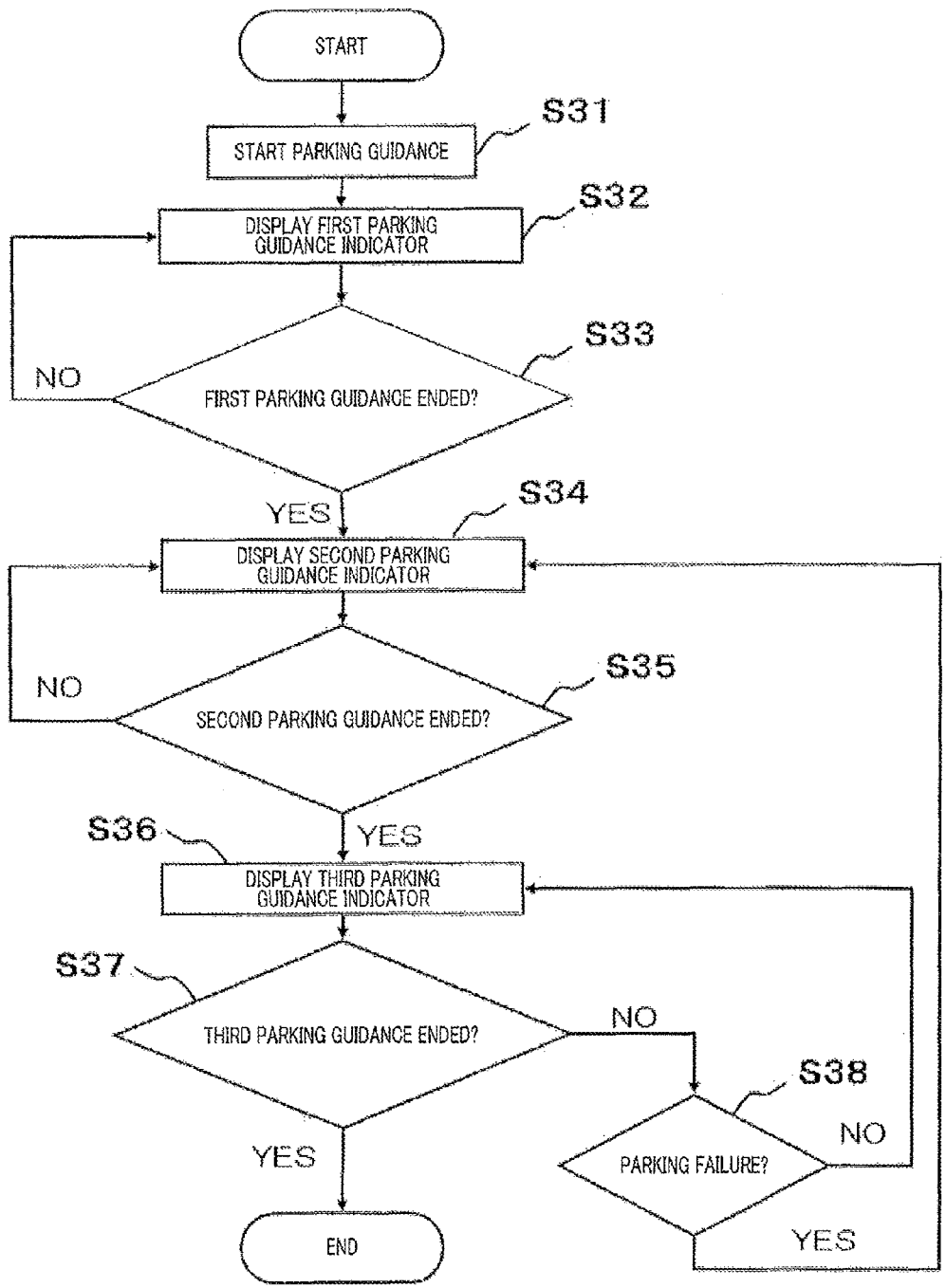
FIG. 3 is a flowchart of parking assistance processing by a control apparatus that is a principal part in FIG. 1.

FIG. 3 is a flowchart of the parking assistance processing by control apparatus 11.

First, as shown in step S31, control apparatus 11 starts parking guidance based on an input signal from at least one of input apparatus 3, vehicle speed sensor 4, steering angle sensor 5, and shift lever state detection sensor 6. This starting of the parking guidance may be implemented manually by the driver, or may be implemented automatically. For example, control apparatus 11 starts the parking guidance when a start command signal is input from input apparatus 3. Also, control apparatus 11 may start the parking guidance automatically when an indication that the shift lever is placed in Drive is input from shift lever state detection sensor 6, and a signal indicating movement at a crawl or slower and a signal indicating a steering angle less than or equal to a predetermined value are input continuously for a certain period from vehicle speed sensor 4 and steering angle sensor 5, respectively. Furthermore, control apparatus 11 may the start parking guidance automatically when an indication that the shift lever state has been moved from Drive to Reverse is input from shift lever state detection sensor 6.

Next, in step S32, control apparatus 11 selects the first parking guidance indicator from nonvolatile memory 9 in order to guide the vehicle to the parking start position. Then image superimposition section 10B of image processing apparatus 10 superimposes the image data of the vehicle and the first parking guidance indicator on the overhead image based on a command of control apparatus 11. The positional relationship between the image data of the vehicle and the first parking guidance indicator is kept constant at all times irrespective of movement of the vehicle. Image processing apparatus 10 outputs a composite image on which the first parking guidance indicator is superimposed to display apparatus 7 as video. Then display apparatus 7 displays the overhead image of the surroundings of the vehicle on which the first parking guidance indicator is superimposed.

Next, as shown in step S33, control apparatus 11 determines whether or not first parking guidance for guiding the vehicle to the parking start position has ended. Here, whether or not the first parking guidance has ended is determined by whether or not the first parking guidance indicator is within the target parking space (final parking position). For example, if control apparatus 11 determines that the first parking guidance indicator is within a parking space detected by means of sonar (not shown), control apparatus 11 determines that the first parking guidance has ended. If the sonar is not connected to parking assistance apparatus 1, the driver determining that the first parking guidance indicator is within the parking space may, for example, issue a first parking guidance termination command to input apparatus 3. In this case, control apparatus 11 can determine that the first parking guidance indicator is within the parking space by means of the first parking guidance termination command via input apparatus 3. Also, for example, control apparatus 11 may make a first parking guidance termination command determination in a similar way to input apparatus 3 if information indicating that the shift lever has been put into Reverse is input from shift lever state detection sensor 6.

In the case of a NO determination in step S33, control apparatus 11 performs the step S32 processing again.

On the other hand, in the case of a YES determination in step S33, as shown in step S34, control apparatus 11 selects the second parking guidance indicator from nonvolatile memory 9 in order to guide the vehicle to the steering wheel reversal start position. Then image superimposition section 10B of image processing apparatus 10 superimposes the image data of the vehicle and the second parking guidance indicator on the overhead image based on a command of control apparatus 11. The positional relationship between the image data of the vehicle and the second parking guidance indicator is kept constant at all times irrespective of movement of the vehicle. Image processing apparatus 10 outputs a composite image on which the second parking guidance indicator is superimposed to display apparatus 7 as video. Then display apparatus 7 displays the overhead image of the surroundings of the vehicle on which the second parking guidance indicator is superimposed.

Next, as shown in step S35, control apparatus 11 determines whether or not second parking guidance for guiding the vehicle to the steering wheel reversal start position has ended. Here, whether or not the second parking guidance has ended is determined by whether or not the second parking guidance indicator is within the target parking space (final parking position). For example, if control apparatus 11 determines that the second parking guidance indicator is within a parking space detected by means of sonar (not shown), control apparatus 11 determines that the second parking guidance has ended. If the sonar is not connected to parking assistance apparatus 1, the driver determining that the second parking guidance indicator is within the parking space may, for example, issue a second parking guidance termination command to input apparatus 3. In this case, control apparatus 11 can determine that the second parking guidance indicator is within the parking space by means of the second parking guidance termination command via input apparatus 3.

In the case of a NO determination in step S35, control apparatus 11 performs the step S34 processing again.

On the other hand, in the case of a YES determination in step S35, as shown in step S36, control apparatus 11 selects the third parking guidance indicator from nonvolatile memory 9 in order to guide the vehicle to the target parking space (final parking position). Then image superimposition section 10B of image processing apparatus 10 superimposes the image data of the vehicle and the third parking guidance indicator on the overhead image based on a command of control apparatus 11. The positional relationship between the image data of the vehicle and the third parking guidance indicator is kept constant at all times irrespective of movement of the vehicle. Image processing apparatus 10 outputs a composite image on which the third parking guidance indicator is superimposed to display apparatus 7 as video. Then display apparatus 7 displays the overhead image of the surroundings of the vehicle on which the third parking guidance indicator is superimposed.

Next, as shown in step S37, control apparatus 11 determines whether or not third parking guidance for guiding the vehicle to the target parking space (final parking position) has ended. Here, whether or not the third parking guidance has ended is determined by whether or not the third parking guidance indicator is within the target parking space (final parking position). For example, if control apparatus 11 determines that the third parking guidance indicator is within a parking space detected by means of sonar (not shown), control apparatus 11 determines that the third parking guidance has ended. If the sonar is not connected to parking assistance apparatus 1, the driver determining that the third parking guidance indicator is within the parking space may, for example, issue a third parking guidance termination command to input apparatus 3. In this case, control apparatus 11 can determine that the third parking guidance indicator is within the parking space by means of the third parking guidance termination command via input apparatus 3.

In the case of a YES determination in step S37, control apparatus 11 determines that the vehicle is within the target parking space (final parking position), and terminates the parking assistance processing.

On the other hand, in the case of a NO determination in step S37, control apparatus 11 determines whether or not parking by means of the third parking guidance has failed as shown in step S38.

In the case of a NO determination in step S38, control apparatus 11 performs the step S36 processing again.

On the other hand, in the case of a YES determination in step S38, control apparatus 11 performs the step S34 processing again. By this means, in the event of not being able to park the vehicle in the target parking space (final parking position) due to a steering error or the like, the driver can operate the vehicle again so that the second parking guidance indicator comes within the target parking space (final parking position). By this means, the driver can easily return to the steering wheel reversal start position, enabling parking assistance to be restarted immediately if parking fails initially.

Next, changes in each parking guidance in the video output to display apparatus 7 by image processing apparatus 10 will be described.

Figure 4:
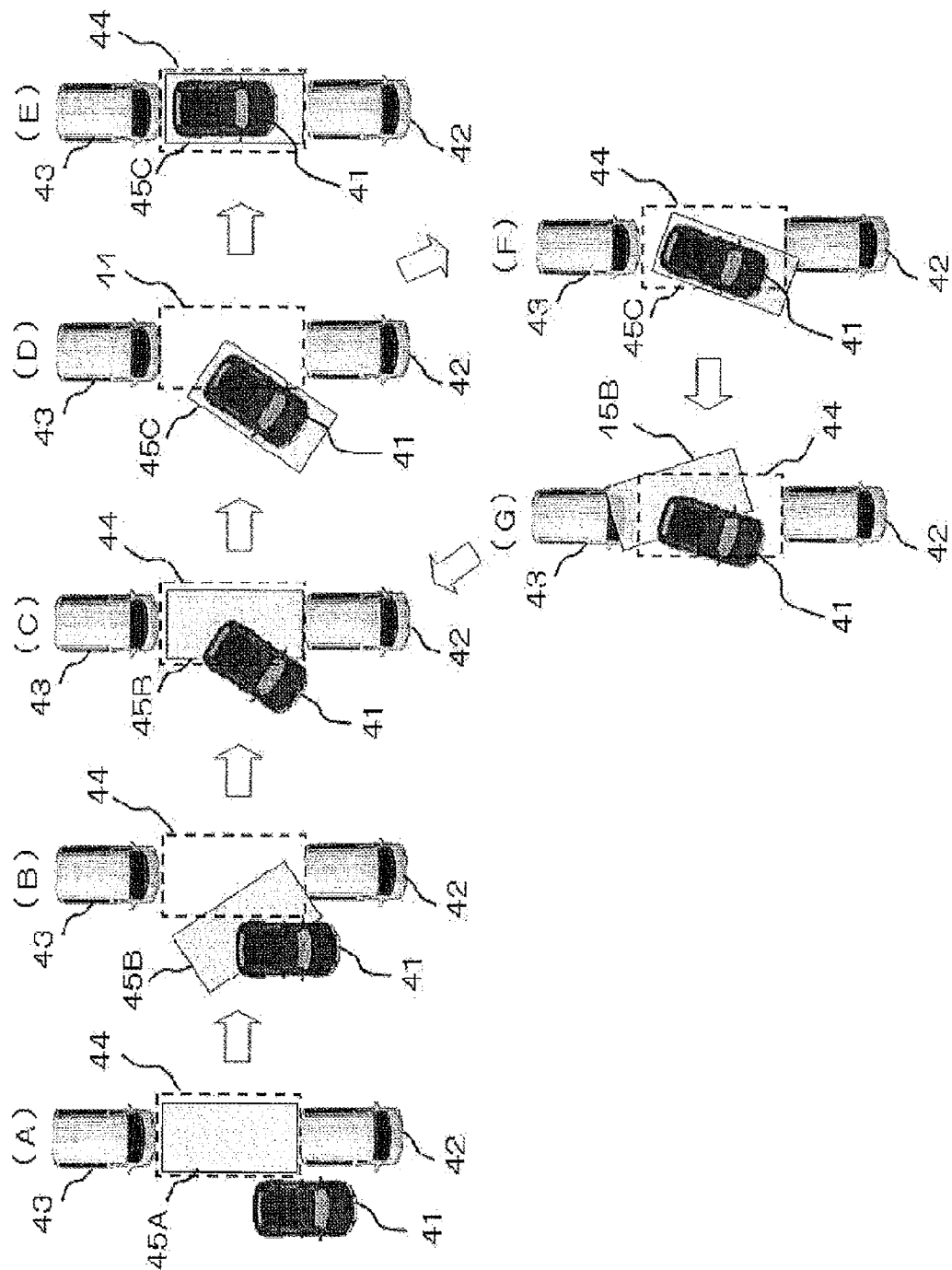
FIG. 4 is a drawing explaining in an image form the transitions of the parking assistance processing in FIG. 3.

FIG. 4 is a drawing explaining in image form the transitions of the parking assistance processing in FIG. 3.

As shown in FIG. 4, state (A) indicates completion of the first parking guidance. In state (A), vehicle 41 takes parking space (final parking position) 44 between parked vehicles 42 and 43 to be a parking target. Image superimposition section 10B performs superimposition on the overhead image keeping the relative positional relationship between vehicle 41 and first parking guidance indicator 45A constant. Therefore, as vehicle 41 moves forward (toward the bottom of the drawing), first parking guidance indicator 45A also moves forward by the same amount. There is an approximately mutually parallel positional relationship between vehicle 41 and first parking guidance indicator 45A, and they are separated from each other with no overlap area. The position at which the vehicle is present when first parking guidance indicator 45A is within parking space 44 indicates the parking start position of the vehicle. As long as it is possible to park vehicle 41 in parking space 44 from the position of vehicle 41 when first parking guidance indicator 45A is within parking space 44 (the parking start position), the positional relationship between vehicle 41 and first parking guidance indicator 45A may be arbitrary.

When first parking guidance indicator 45A is within parking space 44, the parking assistance processing transits to state (B) indicating the second parking guidance. In state (B), vehicle 41 moves backward with the steering wheel turned fully to the left. In response to the command of control apparatus 11, image superimposition section 10B performs the superimposition on the overhead image keeping the relative positional relationship between vehicle 41 and second parking guidance indicator 45B constant. Therefore, as vehicle 41 moves backward with the steering wheel turned fully to the left, second parking guidance indicator 45B also moves backward tracing the same path as vehicle 41. The areas of vehicle 41 and second parking guidance indicator 45B partially overlap. As shown in state (C), the position at which vehicle 41 is present when second parking guidance indicator 45B is within parking space 44 indicates the position at which vehicle 41 steering reversal is started.

When second parking guidance indicator 45B is within parking space 44, the parking assistance processing transits to state (D) indicating the third parking guidance. In state (D), vehicle 41 moves backward with the steering wheel turned fully to the right. In response to the command of control apparatus 11, image superimposition section 10B performs the superimposition on the overhead image keeping the relative positional relationship between vehicle 41 and third parking guidance indicator 45C constant. Therefore, as vehicle 41 moves backward with the steering wheel turned fully to the right, third parking guidance indicator 45C also moves backward tracing the same path as vehicle 41. Third parking guidance indicator 45C accommodates vehicle 41 within its area. Therefore, the position at which vehicle 41 is present when third parking guidance indicator 45C is within parking space 44, as shown in state (E), is within the target parking space (final parking position).

On the other hand, if the steering of vehicle 41 is erroneous from state (D), a case arises in which third parking guidance indicator 45C cannot be accommodated within parking space 44, as shown in state (F). In this case, the parking assistance processing transits to state (G) indicating the second parking guidance again. A transition from state (F) to state (0) is made, for example, if control apparatus 11 determines that vehicle 41 cannot be parked based on the positional relationship between third parking guidance indicator 45C and parking space 44 detected by means of sonar (not shown). If the sonar is not connected to parking assistance apparatus 1, the driver determining that third parking guidance indicator 45C is not within parking space 44 may, for example, cause a transition from state (F) to state (0) by issuing a second parking guidance start command to input apparatus 3. Also, for example, control apparatus 11 may cause a transition from state (F) to state (G) upon making a second parking guidance start command determination in a similar way to input apparatus 3 if information indicating that the shift lever has been put into Drive from Reverse is input from shift lever state detection sensor 6. Then, as shown in state (G), in response to the command of control apparatus 11, image superimposition section 10B performs the superimposition on the overhead image keeping the relative positional relationship between vehicle 41 and second parking guidance indicator 45B constant. Vehicle 41 moves forward with the steering wheel turned to the right. By this means, second parking guidance indicator 45B also moves forward with the steering wheel turned to the right. Then a transition is made from state (G) to state (C) again. By this means, the driver can easily return to the steering wheel reversal start position, enabling parking assistance to be restarted immediately if parking fails initially.

Figure 5A:
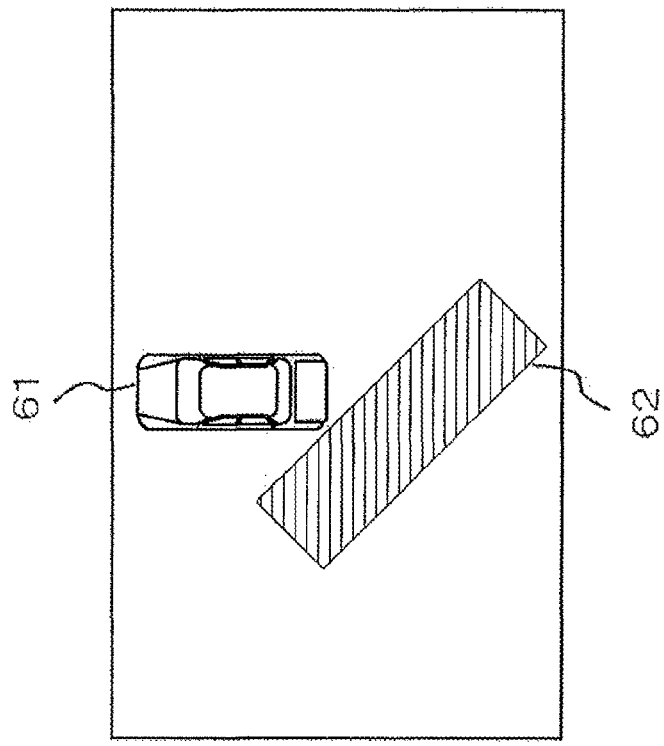
FIG. 5A is a drawing explaining in an image form an example of superimposition of the second parking guidance in FIG. 3.
Figure 5B:
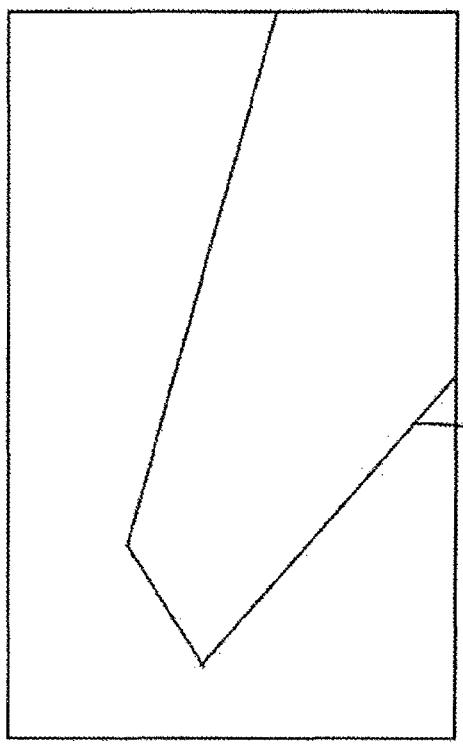
Figure 6A:
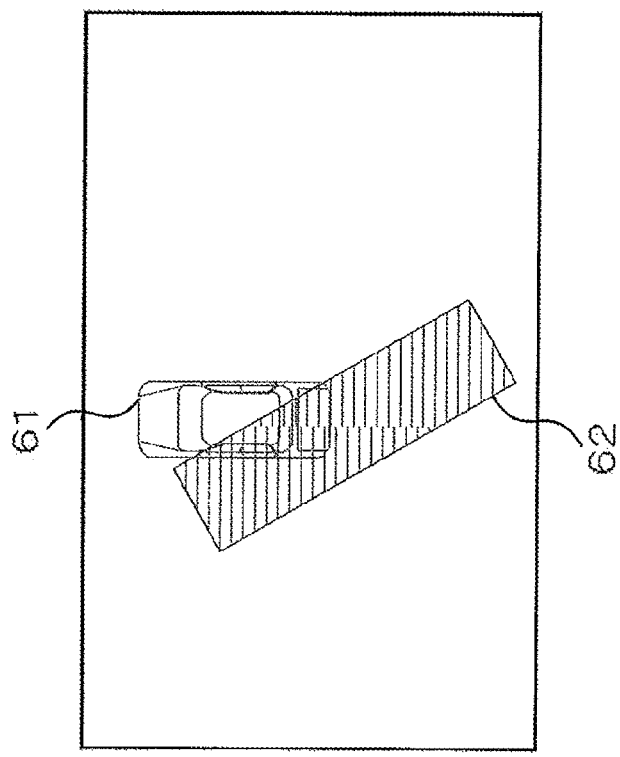
FIG. 6A is a drawing explaining in an image form another example of the superimposition of the second parking guidance in FIG. 3.
Figure 6B:
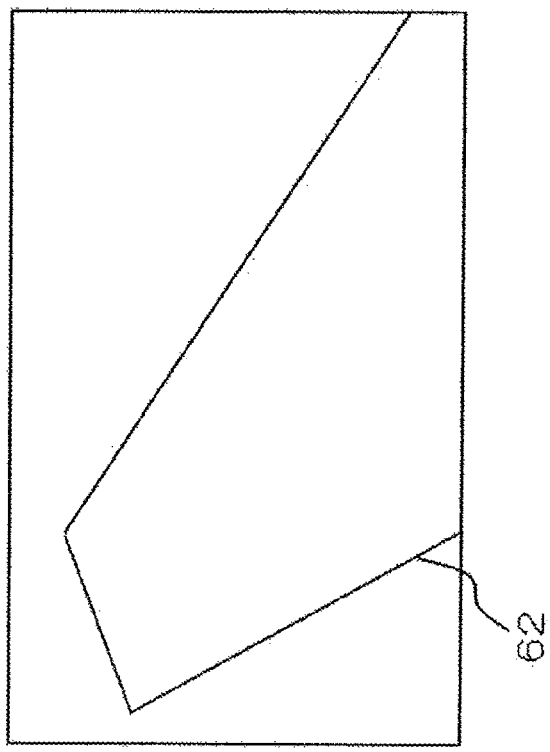
FIG. 6B is a drawing explaining in an image form an example of the superimposition of the second parking guidance in FIG. 3.

In this embodiment, the parking assistance is performed by superimposing the first parking guidance indicator, the second parking guidance indicator, and the third parking guidance indicator on the overhead image created by overhead image creation section 10A, but the superimposition may also be performed on a different image. FIG. 5A and FIG. 5B are drawings explaining in the image forms examples of the superimposition of the second parking guidance in FIG. 3, and FIG. 6A and FIG. 6B are drawings explaining in the image forms another example of the superimposition of the second parking guidance in FIG. 3. Instead of displaying second parking guidance indicator 62 superimposed on an image of vehicle 61 as shown in FIG. 5A, second parking guidance indicator 62 may be superimposed on a rearward image as shown in FIG. 5B. That is to say, control apparatus 11 can determine whether or not the second parking guidance has ended without having image superimposition section 10B superimpose the image of the vehicle. Control apparatus 11 can also determine whether or not the first parking guidance and the third parking guidance have ended in a similar way. Also, the image of vehicle 61 and second parking guidance indicator 62 need not overlap. Furthermore, as shown in FIG. 6A, when the image of vehicle 61 and second parking guidance indicator 62 overlap, the color or transparency of all or part of the image of vehicle 61 may be made fainter. By this means, it is possible to prevent second parking guidance indicator 62 from collapsing and becoming difficult to see.

Also, as long as it is possible to park vehicle 61 in a parking space from the position of vehicle 61 when second parking guidance indicator 62 is within the parking space (the steering wheel reversal start position), the positional relationship between vehicle 61 and second parking guidance indicator 62 may be arbitrary.

Furthermore, in this embodiment, the first parking guidance indicator, the second parking guidance indicator, and the third parking guidance indicator that are superimposed on the overhead image are of the same shape, but when the first parking guidance indicator, the second parking guidance indicator, and the third parking guidance indicator are superimposed on the rearward image as in FIG. 5B or FIG. 6B, viewing becomes more difficult as the third parking guidance indicator approaches the final parking position, and therefore it is only necessary for at least the first parking guidance indicator and the second parking guidance indicator to have the same shape in real space. By this means, the driver can understand the first parking guidance indicator and the second parking guidance indicator that are superimposed on the rearward image by means of a common method of use, and can grasp the method of use easily.

The disclosure of Japanese Patent Application No. 2010-041856, filed on Feb. 26, 2010, including the specification, drawings and abstract, is incorporated herein by reference in its entirety.

INDUSTRIAL APPLICABILITY

The present invention is suitable for use during parking by reversal of the steering wheel.

REFERENCE SIGNS LIST

1 Parking assistance apparatus
2 Imaging apparatus
7 Display apparatus
10 Image processing apparatus
10B Image superimposition section
11 Control apparatus

The invention claimed is:

1. A parking assistance apparatus comprising:
a superimposition section that outputs, to a display section, an image in which a vehicle including the apparatus and a parking guidance indicator are superimposed on an input captured image of surroundings of the vehicle using the same positional relationship irrespective of movement of the vehicle; and
a control section that switches a parking guidance indicator superimposed by this superimposition section according to a stage of parking, wherein:
the control section switches to a first parking guidance indicator during first parking guidance for guiding the vehicle to a parking start position, switches to a second parking guidance indicator during second parking guidance for guiding the vehicle to a steering wheel reversal start position, and switches to a third parking guidance indicator during third parking guidance for guiding the vehicle to a final parking position; and
the final target position of the first parking guidance is entry of the first parking guidance indicator into the final parking position, the final target position of the second parking guidance is entry of the second parking guidance indicator into the final parking position, and the final target position of the third parking guidance is entry of the third parking guidance indicator into the final parking position.

2. The parking assistance apparatus according to claim 1, further comprising an imaging section that images the surroundings of the vehicle,
wherein the superimposition section superimposes the vehicle and the parking guidance indicator on a captured image captured by the imaging section using the same positional relationship irrespective of the movement of the vehicle.

3. The parking assistance apparatus according to claim 1, further comprising a display section connected to the superimposition section,
wherein the display section displays a superimposition image in which the vehicle and the parking guidance indicator are superimposed on the captured image.

4. The parking assistance apparatus according to claim 1, further comprising an overhead image creation section that creates an overhead image from a captured image of the surroundings of the vehicle,
wherein the first, second, and third parking guidance indicators superimposed on the overhead image created by the overhead image creation section are of the same shape.

5. The parking assistance apparatus according to claim 1, wherein the first and second parking guidance indicators superimposed on a captured image of a rearward direction of the vehicle are of the same shape in real space.

* * * * *